United States Patent Office 2,705,053
Patented Mar. 29, 1955

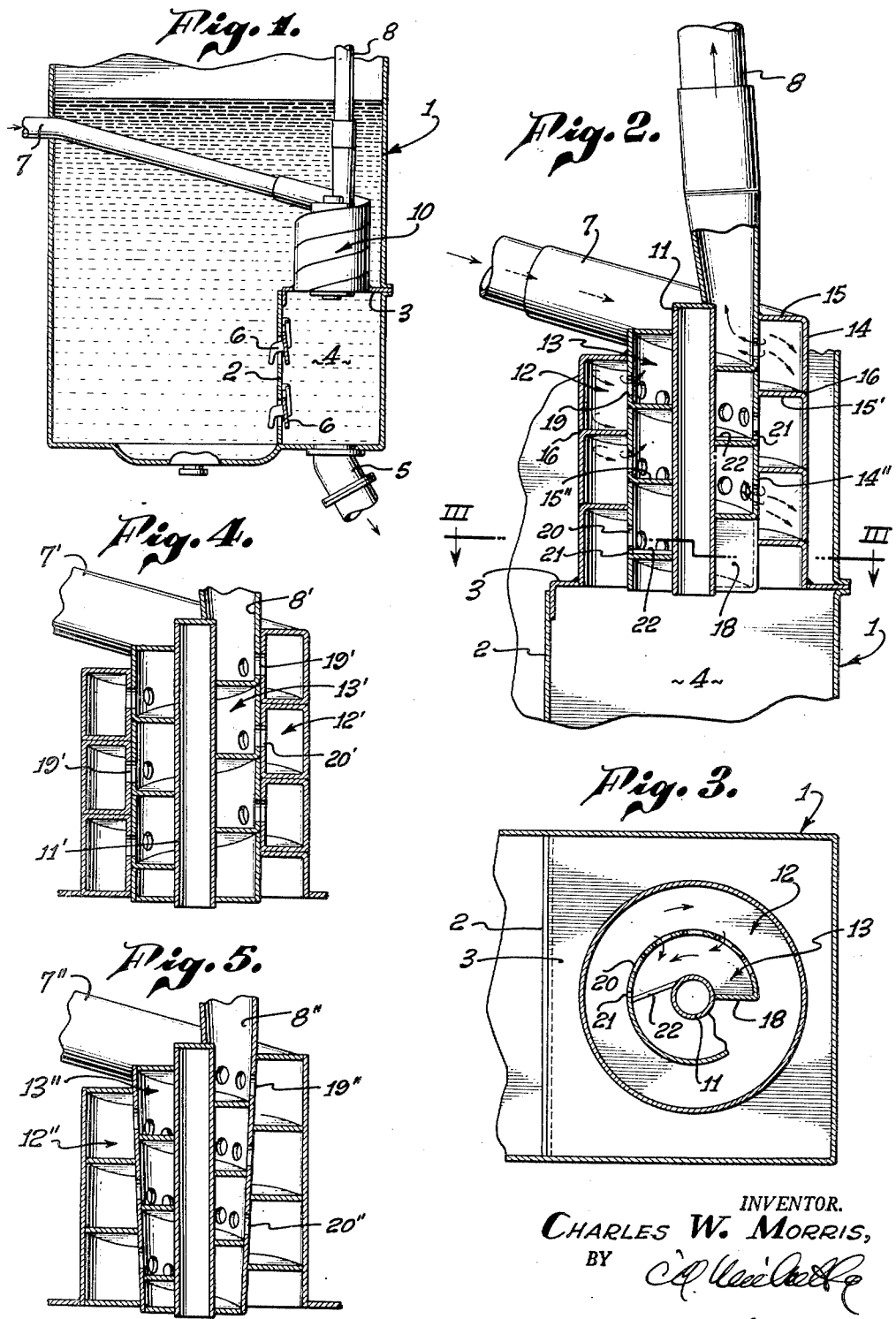

2,705,053

OIL DEGASIFICATION

Charles W. Morris, Los Angeles, Calif., assignor to Doak Aircraft Co., Inc., Torrance, Calif., a corporation of California Application May 14, 1953, Serial No. 355,084

9 Claims. (Cl. 183—2.5)

This invention pertains to means and methods for rapidly degasifying lubricating oil and is particularly directed to a lubricating oil system of a circulating or cycling type wherein a portion, at least, of the oil is converted into a mist or atomized in order to lubricate and simultaneously cool bearings and the like. Although the methods and device of the present invention are capable of being utilized in many technological applications, the invention will be specifically described in its application to the lubricating oil system of a jet or turbojet aircraft engine, since in such engines bearings operate at high speeds and high temperatures and an appreciable proportion of the lubricating oil is supplied to the bearings in atomized form. Moreover, by reason of weight consideration, it is important that the oil be effectively reclaimed and degasified so as to permit its repeated use.

Heretofore devices capable of separating liquid from a gas have been disclosed, but none of the prior devices have been able to effectively separate a liquid from a gas irrespective of the attitude or position of the device. In aircraft, however, the device must operate effectively in normal position, in inverted position and in various attitudes, and in addition, must operate even though the aircraft itself is traveling at high speed and angular velocities which may reach 6 or even 10 "G."

Generally stated, the present invention relates to a lubricating system including a source of mist of lubricating oil and gas and an oil reservoir, oil being pumped from the reservoir to various bearings, atomized or converted into a mist during application to at least some of the bearings and the resulting mist and other used oil then returned to the reservoir by means of a scavenging pump. In accordance with the present invention, a degasifying device is positioned in close proximity to the oil reservoir and receives the mixture of oil and gas from the scavenging pump. In the degasifying device of the present invention, a high angular velocity is imparted to the mixture of oil and gas, preferably by passing such mixture into a helically or spirally arranged conduit, the walls of such conduit facing the axis of revolution being ported and communicating with another conduit, also spirally or helically arranged, one end of such inner conduit being closed and the other end being vented to the atmosphere or communicating with the housing of the engine. By reason of the high angular velocity (sufficient to generate centrifugal forces above 10 "G") air is separated from the liquid oil, the air passing into the inner conduit and being returned to the breather of the engine while degasified oil is discharged from the outer conduit into the reservoir.

It is an object of the present invention, therefore, to disclose and provide a degasifying device capable of operating in any attitude and while the device itself is subjected to high centrifugal forces.

Another object of the invention is to disclose a simple, compact, economical device for degasifying lubricating oils, said device utilizing high angular velocities and being so arranged and constructed that it will operate at normal or in inverted position and at various intermediate positions for periods of time without fouling.

A still further object of the invention is to disclose and provide a degasifying device which employs a pair of nested, helical, or spiral conduits, each of which acts as a centrifuge for the purpose of separating the liquid oil from gas intermixed therewith.

These and various other uses, advantages and adaptations of the invention will become apparent to those skilled in the art from the following description of certain exemplary forms in which the invention may be embodied. In order to facilitate understanding, reference will be had to the appended drawings, in which:

Fig. 1 is a general view, partly schematic, of a portion of an oil reservoir tank equipped with a device of the present invention.

Fig. 2 is an enlarged vertical section taken through one form of device of the present invention.

Fig. 3 is a horizontal section taken along the plane III—III in Fig. 2.

Fig. 4 is a vertical section taken through a modified form of device.

Fig. 5 is a vertical section illustrating a still further modification.

Fig. 1 illustrates a portion of an oil reservoir tank 1, a portion of such tank being compartmented off as by the partitions 2 and 3, thereby forming an outlet compartment 4. Line 5 leads from this compartment to a lubricating pump which supplies lubricating oil to the various bearings, jets, etc. of a turbojet engine. Oil from the main reservoir 1 is normally supplied to the outlet compartment 4 through a flutter valve diagrammatically illustrated at 6, said valve being normally biased (by light spring pressure, counterweights, or a combination thereof) to be maintained in open position when the device is in static, upright position.

The degasifying device of the present invention, generally indicated at 10, may be carried by the wall 3 of the compartment 4 and is provided with an inlet or supply pipe 7 through which lubricating oil and air utilized in atomizing or misting the oil, after having been passed through or around suitable bearings, is returned to the degasifying unit 10 by means of a suitable scavenging pump. The device is also provided with an air vent 8 which may be suitably connected to the breather port of an engine or may exhaust into the atmosphere.

By referring to Figs. 2 and 3, it will be noted that the device, generally speaking, includes an axis member 11 (shown as a hollow tube) the walls of such tube forming a core or inner wall of the entire device. Surrounding the axis member are two coaxial, helically arranged, similarly inclined conduits, generally indicated at 12 and 13. The external conduit 12 is shown formed from a strip of material 14 provided with a lip 15 and thereby having an L-shaped cross section, this strip being wound so that the web 14 forms a cylinder (such cylinder constituting the outer wall of the device) and the lip 15 forms a helix. It will be evident that except at its ends, one surface of the lip 15, such as lip 15', forms the floor of one lay of conduit 12 and simultaneously the ceiling of the adjacent lay of conduit 12. Edges of the strips 14 may be furnace-brazed or otherwise joined as indicated at 16, to hold the helix together and form a liquid-tight conduit.

A similarly arranged and constructed conduit 13 of smaller external diameter is telescopically and coaxially arranged with respect to the conduit 12. It may be noted that the conduit 13 is similarly inclined to the conduit 12 but is out of phase with conduit 12, the lip portion 15" being vertically displaced with respect to the lip 15' of conduit 12. The edges of the lips 15, 15', etc. are in contact with and preferably brazed or otherwise connected to the webs 14" of the inner conduit 13. The webs 14" may be said to form an intermediate wall, between the inner wall formed by axis member 11 and the outer wall portions of external conduit 12.

The supply line 7 (through which oil and gas are supplied to the device) is preferably tangentially connected to the upper end of conduit 12 and the lower end of such conduit discharges into the outlet compartment 4. The lower end of the inner conduit 13 is closed as indicated at 18, and the upper end of such conduit is connected to the gas vent or breather line 8. The entire device is connected to the partition wall 3 in any suitable manner.

It will be noted that radially extending ports, such as 19 and 20, are provided in the common wall formed from the webs 14" of the strip material used in forming conduit 13. These ports preferably communicate with the upper portion of each lay of conduit 12. In addition, several small drainage outlets 21 may be provided in this common wall adjacent the bottom of conduit 13 and ribs or inclined diversion beads 22 may be formed in such bottoms for the purpose of directing oil to the drainage outlets.

The device is designed to separate oil from gas and will handle mixtures containing from 80% oil–20% gas to mixtures containing but 20% oil and 80% gas, although it is to be understood that these examples are given only because they constitute the normal variation which can be expected, the device being capable of use even with mixtures beyond the limits thus given. The radius of curvature or maximum external diameters of conduits 12 and 13 are so selected that the velocity of oil or oil-gas mixture supplied to the device by line 7 will impart to the oil a centrifugal force in excess of 10 "G" and in actual practice, a radial acceleration of between 40 "G." and 200 "G." Under the influence of this high radial acceleration, oil travels along the external wall of conduit 12 and any entrained air is separated therefrom and passes through the ports 19–20 into conduit 13. Since conduit 13 is closed at its lower end 18, the air escapes through the outlet 8. The oil travels downwardly along conduit 12 and is discharged into the compartment 4.

By referring to Fig. 3 it will be noted that air, in passing through the ports 19–20, reverses its direction and all very fine particles of oil mist are thrown out in conduit 12. In the event any oil is thus removed from the air stream in conduit 13, such oil is forced to the outer wall of conduit 13 and discharged therefrom through drainage outlets 21 into the outer conduit 12. Fig. 3 further shows that oil flows along the outer wall of conduit 12 in one direction, whereas the air stream flows through conduit 13 in opposed direction. It will also be noted that although the conduits or channels 12 and 13 have the same lead, they are out of phase with one another.

It will be understood that in static or at rest condition, certain portions of the device may become flooded with oil since the entire device is below the oil level maintained in reservoir 1. However, immediately upon energization of the turbojet engine and as soon as the lubricating pump begins to suck oil from compartment 4 and the scavenging pump begins to supply oil and air through line 7, the device clears itself and conduit 13 becomes filled with air or gas, this condition continuing as long as the scavenging pump continues to supply oil and gas to line 7, irrespective of the attitude, position, or inclination of the entire tank 1. When in substantially inverted position, the flap valves 6 close the ports leading to the main tank 1 and oil is withdrawn from compartment 4 to the lubricating pump, this compartment 4 being sufficiently large to insure a supply of lubricating oil for a predetermined minimum period of time.

It will be observed that although heretofore the oil which was used in the form of a mist in lubricating aft bearings of a turbojet has been discharged overboard, the present invention permits recovery of such oil. Moreover, by placing the device 10 within the oil reservoir 1, certain advantages due to the heat exchange relationship are obtained.

The arrangement illustrated in Fig. 4 differs from that shown in Fig. 1 in that the external conduit 12' is made of tubular stock having a rectangular cross section and the direction of inclination or slope of conduit 13' is reversed with respect to conduit 12'. In this manner, concurrent flow of oil and air is obtained, oil traveling downwardly through conduit 12', whereas oil travels upwardly but in the same angular direction in conduit 13'. This arrangement does not permit radially directed ports to be placed along the entire length of the contacting walls, but an adequate number of ports, such as 19' and 20', permit the air to pass into breather line 8'.

The term "helically arranged," as used herein, is to be broadly interpreted so as to include spiral formations. In other words, the device need not be cylindrical but may also assume conical forms. Fig. 5 illustrates a modification wherein, although the external surface is cylindrical, the common wall separating the external conduit 12" from the internal conduit 13" is of a conical form. Two advantages obtain from this construction; the volumetric capacity of oil conduit 12" increases as the oil reaches the lower discharge outlet, thereby insuring the presence of a higher velocity in the upper portions of the device, and the volumetric capacity or cross section of the gas conduit 13" increases as the air approaches the breather line 8". Moreover, assembly of the concentric, telescoped conduits is facilitated.

As previously indicated, the cross-sectional areas of the conduits should be adequate to accommodate the mass and volume of oil and gas supplied thereto and the radius of curvature of the helix formed by conduit 12 should be sufficiently small to cause a high centrifugal force to be developed at the velocity with which the oil-gas mixture is supplied by line 7. For example, a device having an external diameter of but 3 in., conduit 12 having a cross section of about 0.8 sq. in., is capable of handling 40 lbs. of oil and an equal volume of air per minute and subject such oil to a radial acceleration and angularly velocity of about 40 "G." A substantially instantaneous separation of gas from oil takes place. The length of travel to which the oil-gas mixture is subjected will depend somewhat upon the radial acceleration generated, the radius of curvature, velocity, etc.; in the specific example referred to a total length of travel of 6 in. to 9 in. has been adequate.

All changes and modifications coming within the scope of the appended claims are embraced thereby.

I claim:

1. In a lubricating system including an oil reservoir, and a source of mist of lubricating oil and gas; an oil degasifying device connected to said oil reservoir, said device comprising: a helically arranged conduit provided with an inlet for gas and oil at its upper end and an oil outlet at its lower end in communication with the said oil reservoir; a helically arranged, similarly inclined conduit of smaller external radius of generation than said first-named conduit and telescoping and coaxially arranged with respect to said first-named conduit, said smaller conduit having a closed lower end, a gas outlet at the upper end and a series of radially outwardly extending ports in communication with the first-named conduit; and means for supplying mixed oil and gas at high velocity from a source to the inlet of said first named conduit.

2. A system of the character stated in claim 1, wherein the said helically arranged conduits have a common lead but are out of phase with each other, whereby the bottom of the first-named conduit lies below the level of the bottom of the conduit of smaller radius of generation.

3. An oil degasifying device comprising: an outer wall, an inner wall, and an intermediate wall, said walls being coaxially arranged in spaced relation; a helically arranged partition extending between said outer and intermediate wall to form a helical conduit, means for connecting the upper end of said conduit to a source of oil and gas, an outlet communicating the lower end of said conduit with an oil reservoir; a helically arranged partition between the intermediate wall and inner wall to form a second helical conduit, closed at its lower end; a gas outlet connected to the upper end of said second conduit; and a plurality of spaced ports in said intermediate wall communicating said conduits.

4. A device of the character stated in claim 3, wherein said partitions are arranged with a common lead and are similarly inclined.

5. A device of the character stated in claim 3, wherein said partitions are arranged with a common lead and are oppositely inclined.

6. A device of the character stated in claim 3, wherein said partitions are arranged with a common lead but are out of phase with each other.

7. A device of the character stated in claim 3, wherein at least one of the walls is virtually cylindrical.

8. A device of the character stated in claim 3, wherein at least one of said walls is virtually conical.

9. A device for separating gas from mixtures of gas and lubricating oil comprising: a centrally disposed axis member; a strip of material having a lip, said strip being formed into a cylinder with the lip defining a helix in contact with the axis member, an edge of said strip being connected to the opposing edge of an adjacent lay to form a conduit wherein one surface of the lip forms the floor and the other surface of the lip forms the ceiling of the conduit; means closing the lower end of the conduit; a gas outlet at the upper end of the conduit; a second strip of material having a lip extending therefrom and formed into an outer cylinder with the lip defining a helix in contact with the first-named cylinder, space between said lip forming a helical outer conduit; ports formed in said first cylinder communicating said first and last-named conduit; an inlet for gas and oil into the upper end of the outer conduit; and an oil outlet at the lower end of the outer conduit.

References Cited in the file of this patent

UNITED STATES PATENTS

| | | |
|---|---|---|
| 1,754,126 | Stievenart | Apr. 8, 1930 |
| 1,863,111 | Greve | June 14, 1932 |
| 2,316,729 | Tryon | Apr. 13, 1943 |
| 2,344,898 | Rathbun | Mar. 21, 1944 |
| 2,432,757 | Weniger | Dec. 16, 1947 |

FOREIGN PATENTS

| | | |
|---|---|---|
| 189,329 | Germany | Sept. 28, 1907 |